Aug. 21, 1945. R. L. LOVELL 2,383,326
POULTRY BATTERY SYSTEM AND CLEANING APPARATUS THEREFOR
Filed Nov. 14, 1941 2 Sheets-Sheet 1
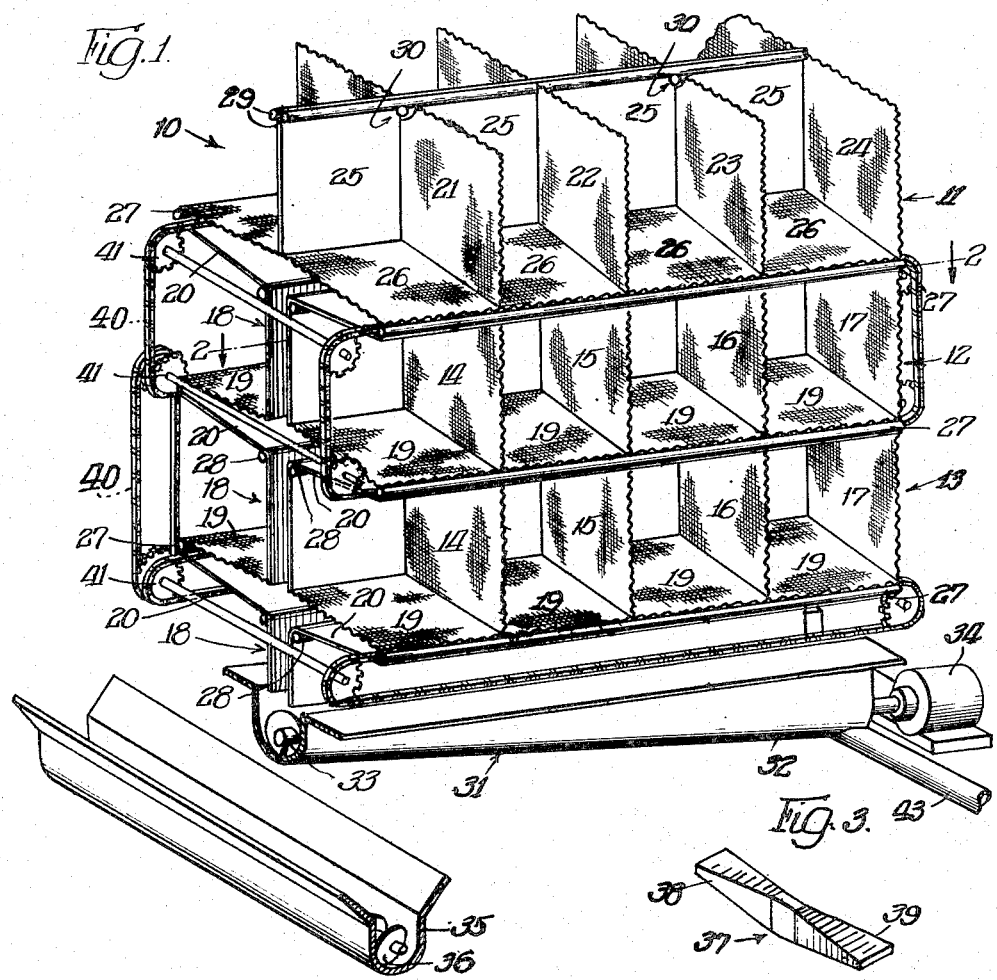
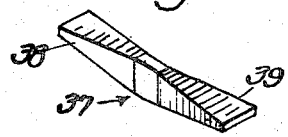
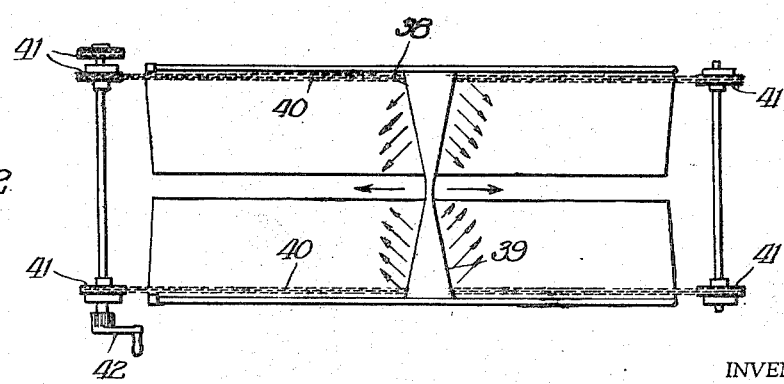
INVENTOR.
Raymond Laird Lovell,
BY Cromwell, Greist & Warden
Attys Aug. 21, 1945.  R. L. LOVELL  2,383,326
POULTRY BATTERY SYSTEM AND CLEANING APPARATUS THEREFOR
Filed Nov. 14, 1941  2 Sheets-Sheet 2

INVENTOR.
Raymond Laird Lovell,
BY
Cromwell, Greist & Warden
ATTYS

Patented Aug. 21, 1945

2,383,326

UNITED STATES PATENT OFFICE 2,383,326

POULTRY BATTERY SYSTEM AND CLEANING APPARATUS THEREFOR

Raymond L. Lovell, South Lyon, Mich.

Application November 14, 1941, Serial No. 419,074

4 Claims. (Cl. 119—22)

The present invention relates to improvements in battery systems for poultry raising. More particularly, it pertains to cleaning having correlated improvements and discoveries whereby the economic and sanitary advantages of such a system are considerably enhanced.

Heretofore, various types of apparatus designed for such purposes and particularly for cleaning facilities have been used. For example, so-called dropping pans or manure accumulators beneath compartment floors had to be hand-scraped after being mechanically dragged, swept and hose-flushed and finally brushed clean. The accumulated droppings were gathered in disposal pans, individually handled and removed by attendants who carried the excrement outside the poultry house for ultimate disposal elsewhere. The atmosphere and surroundings generally became disagreeably affected and malodorous and it readily can be appreciated that, respecting cleanliness and sanitation and the difficulties encountered persuading even trained attendants to remain at such labor, an acute problem was presented. This problem has now been solved in accordance with the principles of the present invention by overcoming these and other difficulties and disadvantages.

Generally, it is an object of the present invention to provide a battery system and apparatus for poultry feeding and raising having cleaning devices which are economical of manufacture, sturdy and durable of construction and which will operate with freedom from wear and tear and other mechanical difficulties and disadvantages to the end that maximum sanitation conditions will prevail.

A principal object of the present invention is the provision of a means for the removal of poultry excrement from such a battery raising apparatus, whether in single or combined units, with a minimum of manual operation and elimination of handling by attendants of such excrement and to deposit the same exteriorly of the poultry houses.

Specifically, it is an object of the present invention to provide for the removal of such poultry excrement from poultry-raising apparatus having a plurality of decks in which the accumulation of excrement from each deck falls straight into a trough and is then exteriorly deposited.

More specifically, it is an object of the present invention to provide for the removal of such excrement without manual handling thereof by attendants and to maintain the excrement or manure as dry as possible by separating the manure from the feed and flush waters thereby to minimize the evolution of gases and odors and then separately to deposit each exteriorly of the poultry houses for ultimate removal and disposal.

Another object of the present invention is to provide for the removal of such manure by the accumulation thereof regardless of the length of each deck or series of decks comprising a unit without fear of jamming, crowding, spilling, etc.

A further object of the present invention is to provide for the removal of poultry excrement in which the same is scraped from the dropping pans and directed between adjacent rows of poultry and progressively gravitated therebetween for final accumulation and separation exteriorly of the vicinity of the apparatus.

These and other objects of the invention will in part be obvious and will in part appear hereinafter.

The invention accordingly comprises the several steps and the relation of one or more of such steps with respect to each of the others, and the apparatus embodying the features of construction, combinations of elements and arrangements of parts which are adapted to effect such steps all as exemplified in the following detailed disclosure and the scope of the invention of which will be indicated in the claims.

For a fuller understanding of the nature and objects of the invention reference should be had to the following detailed description taken in connection with the accompanying drawings, in which Fig. 1 is a perspective view of a diagrammatic representation of a preferred form of the invention, partly in section and with parts omitted and with parts broken away illustrating the operation of a cleaning, watering and flushing combination in a single unit of a battery poultry raising operation;

Fig. 2 is a plan view, taken along a line 2, 2 of Fig. 1 and looking into the direction of the arrows, of an accumulating pan or scraping means;

Fig. 3 is a perspective view of a preferred form of scraping element;

Figure 4:
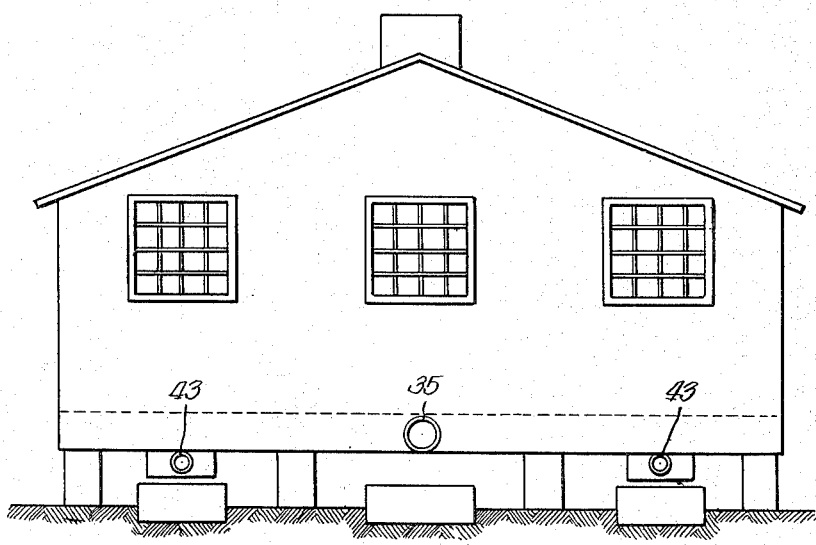
Fig. 4 is an end elevational view illustrating a poultry house showing outlet ports for discharging materials exteriorly thereof.
Figure 5:
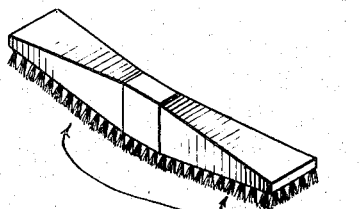
Fig. 5 is a perspective view illustrating a modification of the scraping element in the form of a brushing element.
Figure 6:
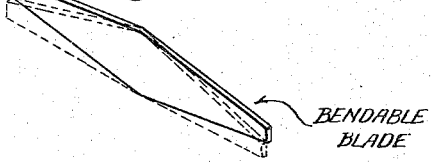
Fig. 6 is another modification of a scraping element in the form of a bendable blade.

Referring more particularly to Fig. 1 of the drawings there is illustrated generally at 10 a schematic representation of a preferred form of the present invention. There is illustrated a unit having three decks, i. e., 11, 12 and 13 each having a plurality of compartments. Each of these compartments is formed by having a longitudinal partition separating a series of transverse partitions and, of course, supplemented by end and side walls (not shown in the interest of clearness of illustration). It should also be noted at this point that a limited number of decks has been shown as well as a limited number of compartments also in the interest of clearness of illustration of the invention although it is contemplated within the scope of the invention that any number of decks suitably long to accommodate any number of compartments may be utilized in practicing the invention. More specifically, it will be seen by reference to the decks, indicated at 12 and 13, that there have been provided transverse partitions 14, 15, 16 and 17 which perpendicularly abut the longitudinal partitions indicated generally at 18. These longitudinal partitions 18 form a series of hoppers each of a dual construction, i. e., they constitute two spaced apart walls running longitudinally of each deck and are disposed one above the other in such a manner that they act to communicate with each other. The bottom end of each of these partitions is connected in any suitable manner to a suitable screening material forming a compartment floor 19 for each of these two decks on each side of the partitions. It will be noted that these screen floors slope downwardly and outwardly to incline laid eggs to a collecting trough (not shown) where they can most conveniently be gathered. Beneath each compartment screen floor is an accumulating floor or pan 20 which is inclined inwardly and downwardly at an angle similar to that of the screen floor 19. These accumulating pans are in effect an extension of the partitions 18 and are integral therewith since it is preferred to make these partitions and accumulating pans from a single sheet of any suitable material. They can if desired be constructed separately and individually connected with each other. The two decks just described may be called intermediate decks in that they differ from the remaining portions of the apparatus. Any suitable number of additional decks, such as those just described, could be added and the construction would be the same.

The upper deck 11 has, of necessity, a construction somewhat different from the lower decks 12 and 13 but generally similar. A number of transverse partitions 21, 22, 23 and 24 similar to those shown at 14 to 17 are also disposed at right angles to a central longitudinal partition. However, since there is no deck above the upper deck it is unnecessary to have dual or spaced apart partitions as shown in the decks below, but a single partition 25 of any suitable material such as screening may be utilized to be suitably connected to a compartment floor 26.

At the outer edge on both sides of the floor of each deck where it tends to meet the inclined accumulating pan there is longitudinally disposed flushing means such as, for example, suitably perforated pipes 27. In the angle formed by the juncture of each inclined accumulating pan and each longitudinal partition section 18 are other pipes 28 which act as feed water dispensing means for the fowl. A similar set of pipes 29 on the single upper partition 25 illustrates more clearly their operation, which, however, is common to the lower feed water dispensing pipes 28. It will be seen that an opening is provided in each alternate transverse partition for example, 21, 23 and 14 and 16, etc., to make room for any suitable type of water outlet, generally indicated at 30, which will cause water to drip automatically, or in response to the billing action of the fowl, housed in the compartments on either side of the alternate partitions.

Communicating with the lowest dual partition or communicating chamber is a trough 31 which is inclined or pitched horizontally backward as indicated at 32. Within this trough is a suitable form of expeller such as, for example, a screw conveyor 33 which is driven in any suitable manner as by a motor 34. At right angles to this lower pit or trough 30 there is a larger trough 35 also preferably equipped with an expeller such as a screw conveyor 36. This trough is directed exteriorly of the poultry house. This latter is the main trough or expeller and adapted to expel the manure from a series of such units as shown in Fig. 1 aligned adjacent each of its sides and automatically remove such manure to a point outside the poultry house. However, when a single apparatus is used there is no necessity for the trough 35, and the trough 31 can be directed exteriorly of the poultry house.

Between each of the angularly spaced apart screen compartment floors and the accumulating pans there is positioned a preferred form of scraping element or blade indicated generally at 37 (Figs. 2 and 3). This scraping element consists of two scraping surfaces 38 and 39 and is preferably made of a solid block of material to give it weight. The bottom or scraping edge of each surface as well as the top is pitched angularly from a central point outwardly to conform to the angle formed by each accumulating pan and compartment floor, where it is adapted to be received. It will be understood that a single bendable blade, for example, could also be used as well as various types of brushing elements, such as a wire brush mounted upon the top of the blade shown adapted simultaneously to scrape the bottom of the screen floors of each compartment. The one shown, however, in the drawings is considered preferable.

Such a scraping element is adapted to scrape forward along each manure accumulating section below each compartment floor and also to scrape back again in the opposite direction. This is preferably accomplished by means of a chain and gear system. For example, a chain 40, preferably affixed to each side or end of the scraping element, is passed around a series of gears 41. By turning a hand crank 42 in either direction the scraping element associated with each accumulating pan is made to function. The scraping elements are simultaneously actuatable in opposite directions.

In operation it will be seen that after the accumulated excrement has passed between the interstices of the inclined compartment screen floors (19 and 26) to the accumulating pans 20 in each deck the apparatus is in condition for scraping. The scraping blades, positioned at the end of each deck, are then dragged across the accumulating pans from one end to the other by means of the gear and chain arrangement. As the blade in each deck is drawn along to perform its scraping operation it will be seen (Fig. 2) that the manure will progressively be gathered and directed from the outwardly extending portions of the scraper inwardly toward the communicating chambers or hoppers formed by each of the dual partitions and since each of these dual chambers communicates with the others the sum of the accumulated manure is progressively accumulated and deposited downwardly into the backwardly inclined trough 31. By virtue of the operation of the screw conveyor 33 the manure is extruded toward the main conveyor and pit 35 and moved outwardly in a steady stream to the outside of the poultry building where it is deposited in pits or wagons ready to draw it away. Preferably immediately after the scraping operation has been performed simultaneously throughout each deck and each successive excrement accumulating pan has been scraped the system is ready to be flushed by opening a suitable valve (not shown) communicating with all of the pipes 27. These pipes having suitably sized perforations are adapted forcefully to wash any adhering manure remaining down the inclined plane and into the accumulating chamber to the trough 31. Because of the inclined construction of this trough the flush water is separated from the semi-solid manure and gathered in a waste pipe 43 which also directs it exteriorly of the poultry house.

As above indicated, the water for drinking purposes runs through pipes 28 and 29 and is dispensed in any suitable manner. The dispensing means may be ordinary perforations which are permitted to drip constantly, or of the type which operates only in response to the billing action of the fowl. However, in either case it will be seen that any waste water which drops downwardly will pass through the screened floor compartments and on to the downwardly inclined accumulating pans where it also seeks its level in the trough 31 and into the waste pipe 43. After the accumulating pan 20 has again been filled with manure, it is only necessary to draw the scrapers in the opposite direction where they will come to rest at the other end of the apparatus after having functioned similarly as above described, whereupon the flushing operation may again be repeated.

An apparatus constructed in accordance with the principles of the present invention has many advantages. For example, it has been estimated that many hours are sometimes required manually to empty, clean and flush such a system. The present invention provides an apparatus which is labor-saving and which can be cleaned in a few minutes. By means of the present invention a maximum of cleanliness and sanitation is obtained and in addition to removing disagreeable odors and gases the life of the apparatus is considerably increased by the constant elimination of caustic alkali, ammonia and other deleterious constituents of the excrement. Particularly is this true by providing for the separation of the semi-solid manure and the flushing water so as to keep the former dry. The particular advantages of such a system are emphasized when the size of the unit is increased by adding to either side any number of additional units. In addition to this, each of these units can consist of any number of compartments in excess of standard length which is estimated at about 14 feet. This is possible because as heretofore indicated the scraping elements do not pile up the manure in front of them as they are dragged through the dropping pans as is characteristic in conventional systems heretofore in use, because as the manure is progressively gathered it is directed inwardly toward the central or longitudinal hopper through which it passes as quickly as it can be scraped so that it cannot gather, jam or obstruct the scraping operation. This is more clearly indicated in Fig. 2 as shown by the arrows.

Another important advantage resides in the manner of dispensing the water for feeding purposes. It has been customary to use separate troughs for drinking purposes usually located on the outside of the container. It is well known that as the bill of the fowl dips constantly into the feeding trough containing the water it becomes wet. The bills are then dipped into the mash or feed and much of it adheres thereto until the chicken again dips into the drinking trough whereupon the mash is washed off. This not only contaminates and clogs the drinking water system with impurities, but also tends to spread disease to other birds. By means of the present feed water dispensing system, and particularly because of its location, the birds are forced to turn and get their drinking water as it emerges intermittently from the pipes, and in doing so if any mash has accumulated on their bills it is washed off and the bill cleansed. In this way the waste water, as well as the mash which is washed from the bill of each bird, is not passed along to others but is dropped through the compartment floor onto the accumulating pan where it, like the flush water, seeks its level between the compartment walls and is washed out in the same manner as the flush water. Such a water feeding system is economical. There is no waste, and cleanliness and sanitation more readily prevail.

It is within the contemplation of the present invention that the entire system can be automatic, i. e., that the scraping elements, as well as the flushing system, can be electrically operated as well as the extruding devices or screw conveyors.

It will thus be seen that the objects hereinbefore set forth may readily and efficiently be attained, and since certain changes in operating the above system and in the construction set forth which embody the invention, may be made without departing from the scope thereof, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

Having described my invention, what I claim as new and desire to secure by Letters Patent is:

1. A poultry house, poultry raising apparatus in the house, said apparatus comprising in combination, upper and lower decks each having manure receiving sections therebeneath, said sections being downwardly and inwardly inclined and in centrally spaced apart relationship and continuing substantially vertically downwardly to form spaced apart longitudinal partitions defining open-ended communicating passages between upper and lower decks, a scraping element for each of said decks located on said manure receiving sections and being shaped so as progressively and simultaneously to scrape said manure from said sections forwardly and inwardly between said spaced apart partitions, and means for receiving the manure and removing it from the house, said means including an accumulating pit located beneath the lowest deck to receive said manure, said pit consisting of a trough encasing a screw expeller whereby accumulated manure from all of said decks is expelled from beneath said apparatus.

2. An apparatus as defined in claim 1 wherein the bottoms of the scraping elements which are adapted to scrape the downwardly and inwardly inclined manure receiving sections coincide with the incline of said sections and in which the scraping faces on said scraping elements converge inwardly from their outer edges toward the longitudinal center of said apparatus whereby manure is scraped inwardly toward the communicating chambers communicating with said accumulating pit.

3. A poultry raising apparatus as defined in claim 1 wherein the scraping elements are simultaneously actuatable in opposite directions by one actuating means connected with each scraper and cooperating with each other in unison whereby the manure receiving sections are simultaneously scraped free of accumulated manure.

4. A poultry raising apparatus as defined in claim 1 wherein the trough is backwardly pitched whereby liquids can be drained off in one direction and solids expelled by said screw expeller and separated from said liquids in an opposite direction.

RAYMOND L. LOVELL.